US007384499B2

(12) United States Patent
Girard et al.

(10) Patent No.: US 7,384,499 B2
(45) Date of Patent: Jun. 10, 2008

(54) APPARATUS FOR TREAD BELT ASSEMBLY (75) Inventors: Jean-Claude Girard, Copley, OH (US); Andres Ignacio Delgado, Medina, OH (US); William Dudley Currie, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 258 days.

(21) Appl. No.: 11/168,801

(22) Filed: Jun. 28, 2005

(65) Prior Publication Data
US 2005/0252611 A1 Nov. 17, 2005

Related U.S. Application Data (62) Division of application No. 10/441,471, filed on May 20, 2003, now abandoned.

(51) Int. Cl.
*B29D 30/26* (2006.01)
(52) U.S. Cl. ............ 156/406.2; 156/414; 156/417
(58) Field of Classification Search ............ 156/126, 156/127, 406.2, 414, 417, 421.8; 249/177, 249/180; 425/56, 57; 492/21
See application file for complete search history.

(56) References Cited

U.S. PATENT DOCUMENTS

| 2,553,722 | A |   | 5/1951  | Peigney       | 18/18    |
|-----------|---|---|---------|---------------|----------|
| 2,878,857 | A | * | 3/1959  | Smith et al.  | 156/406.2 |
| 3,276,930 | A |   | 10/1966 | Keefe, Jr.    | 156/130  |

(Continued)

FOREIGN PATENT DOCUMENTS

EP  0 431 854 A2  6/1991

(Continued)

OTHER PUBLICATIONS

European Search Report, completed Jun. 13, 2007.

*Primary Examiner*—Geoffrey L Knable
(74) *Attorney, Agent, or Firm*—Richard B. O'Planick (57) ABSTRACT A method of building and transferring a tread 12 or a tread belt reinforcing assembly 14 on a building drum 10 is disclosed. The steps include applying at least one uncured tread component 12, 14 onto a radially collapsible building drum 10, inserting the at least one uncured tread component 12 and the radially collapsible building drum 10 into an open segmented mold 2 wherein a plurality of mold tread forming segments 4 are radially expanded; contracting the plurality of mold tread forming segments 4 pressing into the at least one uncured tread component 12, 14; collapsing the building drum 10; and removing the building drum 10 thereby transferring the at least one uncured tread component 12, 14 into the mold. The preferred building drum apparatus 10 has a portable radially expandable and axially rotatable support means 20; a drive means 30 for rotating the support means 20 about the axis, a plurality of arcuate or straight segments 22 slidably mounted over the support means, the plurality of arcuate or straight segments 22 forming an annular building surface 24; a means 40 for radially expanding and contracting the radially expandable and axially rotatable support means; a means for receiving and accepting the tread or tread belt assembly while mounted on the plurality of arcuate or straight segments 22 mounted onto the portable support means 20, the receiving means 2 being a segmented mold 2 with radially movable tread forming segments 4.

4 Claims, 13 Drawing Sheets

U.S. PATENT DOCUMENTS

| | | | | |
|---|---|---|---|---|
| 3,607,555 | A | 9/1971 | Leblond et al. | 156/396 |
| 3,713,929 | A | 1/1973 | Bottasso et al. | 156/127 |
| 3,782,871 | A | 1/1974 | Turk | 425/54 |
| 3,784,437 | A | 1/1974 | Appleby et al. | 156/401 |
| 3,865,669 | A | 2/1975 | Todd | 156/394 |
| 3,865,670 | A | 2/1975 | Habert | 156/394 |
| 3,868,203 | A | 2/1975 | Turk | 425/242 |
| 3,888,720 | A | 6/1975 | Habert | 156/414 |
| 4,043,725 | A | 8/1977 | Schmidt | 425/542 |
| 4,198,372 | A * | 4/1980 | Calori | 264/326 |
| 4,207,052 | A | 6/1980 | Satzler | |
| 4,268,330 | A | 5/1981 | Komatsu et al. | 156/111 |
| 4,279,856 | A | 7/1981 | Vente et al. | 264/313 |
| 4,738,738 | A * | 4/1988 | Holroyd et al. | 156/129 |
| 5,201,975 | A | 4/1993 | Holroyd et al. | 156/124 |
| 5,248,357 | A | 9/1993 | Miyanaga et al. | 156/128.1 |
| 5,290,376 | A | 3/1994 | Siegenthaler | 156/129 |
| 5,851,557 | A | 12/1998 | Pouille et al. | |
| 6,139,668 | A | 10/2000 | Stokes et al. | 156/111 |
| 6,235,135 | B1 | 5/2001 | Sergel et al. | 156/131 |

FOREIGN PATENT DOCUMENTS

| | | |
|---|---|---|
| EP | 0479079 | 4/1992 |
| EP | 0884167 | 12/1998 |
| GB | 1 223 242 | 2/1971 |
| GB | 2133357 | 7/1984 |

* cited by examiner

APPARATUS FOR TREAD BELT ASSEMBLY

This is a Divisional of U.S. patent application Ser. No. 10/441,471, filed May 20, 2003, now abandoned.

FIELD OF THE INVENTION

This invention relates to a method and an apparatus for building and transferring a tread or a tread belt reinforcing structure on a building drum.

BACKGROUND OF THE INVENTION

In the manufacture of pneumatic tires elastomeric components, some of which are reinforced by cords of textile or wire, are formed as long strips. These strips are assembled together to form a carcass subassembly in a first stage of assembly. This carcass typically has one or more cord reinforced plies, a pair of bead cores and an air impervious liner. Additional strips of material such as apexes, shoulder gum strips and chippers and chaffers may also be used in this first stage of tire assembly.

In a second stage the tread rubber and belt or breaker reinforcing structure is typically applied to the carcass after the carcass has been toroidally shaped on the tire building drum. The tread rubber can be of one homogeneous compound or more. Typically the tread is a sophisticated composite of many different rubber materials co-extruded to form a tread strip. The belt or breaker reinforcing layers generally include two layers or more of cross plies reinforced by equal but oppositely oriented cords of textiles, such as nylon or aramid or wire such as steel. Additionally, overlays or underlays of generally circumferentially oriented cords may be added as an additional layer.

Tires typically have been built using this two-stage assembly. Once assembled this uncured assembly of the components is placed in a mold to be vulcanized to form a finished tire.

High speed and efficient ways to manufacture tires require the processes to be reliable and fast. Accordingly, manufacturers of tires have experimented with and perfected many ways to improve on the basic two-stage assembly of tires.

One method described in U.S. Pat. No. 3,865,670 taught the use of an expansible and contractible transfer ring for conveying a breaker tread assembly from a building drum in a tire building machine to a tire carcass mounted on a tire shaping machine.

An improved but somewhat similar U.S. Pat. No. 3,888,720 also disclosed a separate tread breaker building drum designed to vary in size to accommodate different sizes of tires.

Similarly, the Charles E. Todd U.S. Pat. No. 3,865,669 also disclosed an expansible and contractible transfer ring for conveying a breaker-tread assembly.

Each of these prior art patents recognized that an assembly of a tread belt to a tire carcass can be accomplished off-line or separate from the carcass building machine. Once formed into a ring these tread breaker assemblies could be moved to encircle a tire carcass, the carcass inflated to contact the inner surface of the tread breaker assembly and then stitched together by a roller mechanism to form a green or uncured tire assembly to be placed into a mold.

While these assembly techniques provided efficiencies in production, none really changed the method for actually forming a tire assembly.

Conventional tire molds, whether two piece molds or segmented molds, form the tread surfaces by pressing groove forming ribs and sipe forming blades into the tread rubber as the tire is molded. As this is done the belt cords, particularly those directly under the groove-forming ribs deflect in small but noticeable undulations. These undulations create a variety of changes across the tread that actually can vary the surface or change the amount of tread rubber across the otherwise normal appearing tire. These non-uniformities can lead to mass imbalance issues, irregular wear and a variety of associated ride and handling performance issues. The goal in tire manufacturing is to minimize unpredictable non-uniformities in manufacturing while also building the tire in a very cost-efficient manner.

The object of the present invention is to provide a method that minimizes or eliminates the influence of the tread forming mold surfaces as the tire is molded.

A further object of the invention is to provide a more productive method of assembling the tread-belt or breaker reinforcing structure to the carcass.

Another objective is to change the method of how the tread forming surfaces engage the tread rubber.

Still another objective is to provide a novel apparatus for forming the tread-belt or breaker assembly and to employ that apparatus to a unique tire building system.

SUMMARY OF THE INVENTION

A method of building and transferring a tread on a tread belt reinforcing assembly on a building drum is disclosed. The steps include applying at least one uncured tread component onto a radially collapsible building drum; inserting the at least one uncured tread component and the radially collapsible building drum into an open segmented mold wherein a plurality of tread forming segments are radially expanded; contracting the plurality of tread forming segments pressing into the at least one uncured tread component; collapsing the building drum; and removing the building drum thereby transferring the at least one uncured tread component into the mold.

The method further includes inserting a tire carcass into the mold; closing the mold; expanding the carcass under pressure forcing the carcass into contact with the at least one uncured tread component forming a tire assembly; and curing the assembly.

Preferably, the method provides the additional step of heating the at least one uncured tread component to a temperature above ambient most preferably at 110° C. or more, prior to closing the segments and wherein the at least one uncured tread component is warmed and softened as the segments press into the tread.

The step of applying at least one uncured tread component also can include applying one or more cord reinforced belt, breaker, overlay or underlay layers onto the building drum prior to applying one or more layers or strips of uncured tread rubber to form a tread-belt reinforcing assembly.

The apparatus for building and transferring a tread or tread belt reinforcing assembly has a radially expandable and axially rotatable support means; a drive means for rotating the support means about the axis; a plurality of arcuate or straight segments slidably mounted over the support means, the plurality of arcuate or straight segments forming an annular building surface; a transfer means for removing the plurality of arcuate or straight segments from the support means and wherein the transfer means provides radial support for the plurality of arcuate or straight segments when the support means is contracted.

The apparatus further includes a means for radially expanding and contracting the radially expandable and axially rotatable support means.

The preferred apparatus has a portable radially expandable and axially rotatable support means; a drive means for rotating the support means about the axis, a plurality of arcuate or straight segments slidably mounted over the support means, the plurality of arcuate or straight segments forming an annular building surface; a means for radially expanding and contracting the radially expandable and axially rotatable support means; a means for receiving and accepting the tread or tread belt assembly while mounted on the plurality of arcuate or straight segments mounted onto the portable support means, the receiving means being a segmented mold with radially movable tread forming segments.

The preferred apparatus further has a plurality of arcuate or straight gap spanners interposed between an adjacent pair of arcuate or straight segments and wherein each pair of adjacent arcuate or straight segments has a gap of at least 0.050 in. (1.25 mm) in the radially expanded position, the gap spanners providing a radially outer surface which bridges between and overlaps pairs of adjacent segments. When radially contracted the arcuate or straight segments reduce the circumferential gap and thereby circumferentially reduce the length of the surface supporting the tread or tread belt reinforcing assembly, thereby releasing the tread or tread belt assembly.

The arcuate or straight segments and the overlapping gap spanners when mounted on the support means and fully expanded provide a rigid internal surface that prevents the tread or tread belt assembly from locally distorting as the mold tread forming segments are closed. Once closed the tread rubber is pressed into the tread forming surface securing the tread or tread belt reinforcing assembly. Once secured the arcuate or straight segments of the support means are contracted releasing from the inner surface of the tread or tread belt assembly. After contracting, the entire portable support means with contracted arcuate or straight segments can be removed from the mold while the mold's tread forming segments are in a closed position holding the tread or tread belt assembly. Then the uncured carcass can be placed into the mold and the mold closed and the curing processes can be initiated.

Definitions

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Breaker Structure" refers to at least two annular layers or plies of parallel reinforcement cords oppositely oriented having the same angle or about 5° less than the parallel reinforcing cords in carcass plies, generally about 20° to less than 50° with reference to the equatorial plan of the tire.

"Belt Structure" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the carcass, the belt reinforcement and other components of the tire excluding the tread.

"Chafers" refers to narrow strips of material placed around the outside of the bead to protect cord plies from the riin, distribute flexing above the rim, and to seal the tire.

"Circumferential" means lines or directions extending along the perimeter of the surface of the annular tread perpendicular to the axial direction.

"Cord" means one of the reinforcement filaments, cables, or strands of which the plies in the tire are comprised.

"Equatorial plane (EP)" means the plane perpendicular to the tire's axis of rotation and passing through the center of its tread.

"Innerliner or liner" means the layer or layers of elastomer or other material that form the inside surface of a tubeless tire and that contain the inflating fluid within the tire.

"Overlay" means one or more layers of parallel cords underlying tread above the belt structure and having cord angles typically 0° to 15° with respect to the equatorial plane of the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65°-90° with respect to the equatorial plane of the tire.

"Section height" means the radial distance from the nominal rim diameter to the outer diameter of the tire at its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Shoulder gum strip" means an elastomeric reinforcement located in the shoulder region of the carcass.

"Sidewall" means that elastomeric portion of a tire between the tread and the bead.

"Subassembly" means an unvulcanized assembly of laminated unreinforced tire components to which a cord reinforced ply or plies and other tire components can be added to form a casing.

"Tread" means a rubber component which when bonded to a tire carcass includes that portion of the tire that come into contact with the road when the tire is normally inflated and under normal load.

"Tread width" means the arc length of the tread surface in the axial direction, that is, in a plane parallel to the axis of rotation of the tire.

"Underlay" means one or more layers of parallel cords underlying the belt structure or at least one layer of the belt structure and having cord angles typically 0° to 15° with respect to the equatorial plane of the tire.

BRIEF DESCRIPTION OF THE DRAWINGS

The invention will be described by way of example and with reference to the accompanying drawings in which.

DETAILED DESCRIPTION OF THE INVENTION

Figure 1:
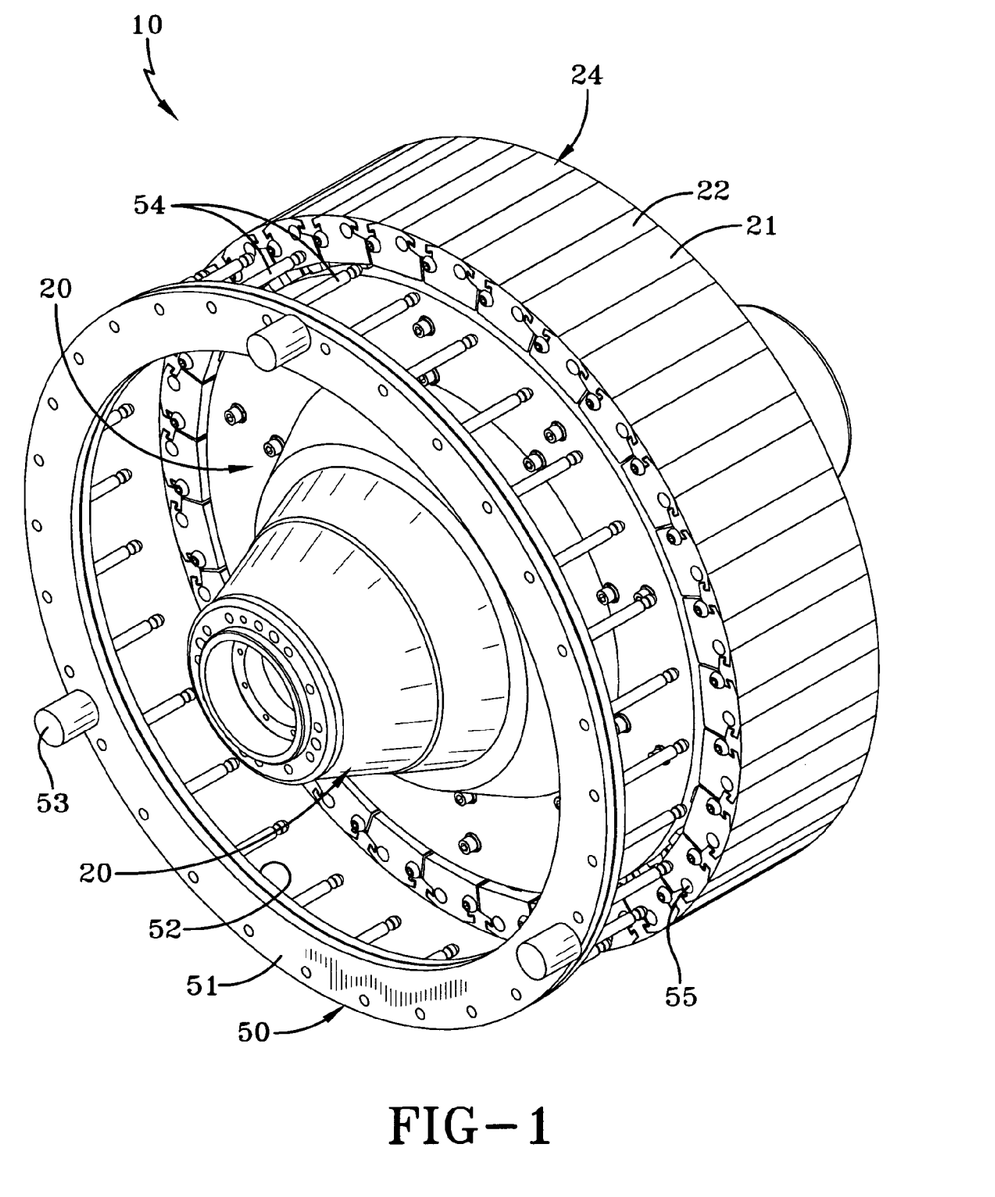
FIG. 1 is a perspective view of the tread or tread belt assembly building drum of the present invention.

With reference to FIG. 1, a perspective view of the tread or tread belt assembly building drum of the present invention is illustrated. As shown, the building drum 10 has a radially expandable and contractible support means 20. The support means 20 has a radially outer surface 24 for building a tread or tread belt reinforcing structure onto the surface 24. The surface has a plurality of arcuate or straight segments 22 which are connected by gap spanner segments 21 around the peripheral surface of the tread building support means. The arcuate or straight segments 22 and gap spanner segments 21 are slidably attached onto the building drum support means 20. Each arcuate segment 22 has a hole or opening 55 for accepting a plurality of pins located on a transfer means 50. The pins 54 can be pressed into the openings 55 and provide a means 50 for transferring the arcuate or straight segments and gap spanner segments as an assembly onto and off the support means 20.

As used herein, each segment 22 and gap spanner segment 21 can have a flat or straight circumferentially or laterally extending surface or, alternatively, an arcuate surface. Hereinafter the segments will be generally referred to as arcuate while it is understood the surface may be straight in either the circumferential direction or the lateral direction.

As illustrated, in FIG. 1 the transfer means 50 has an annular transfer ring 51 and a guide ring 52. The guide ring 52 is slidably inserted over the pins 54 and the pins 54 are rigidly attached to the transfer ring 51 as shown. On the exterior surface of the transfer means 50 are shown three knobs 53.

Figure 2:
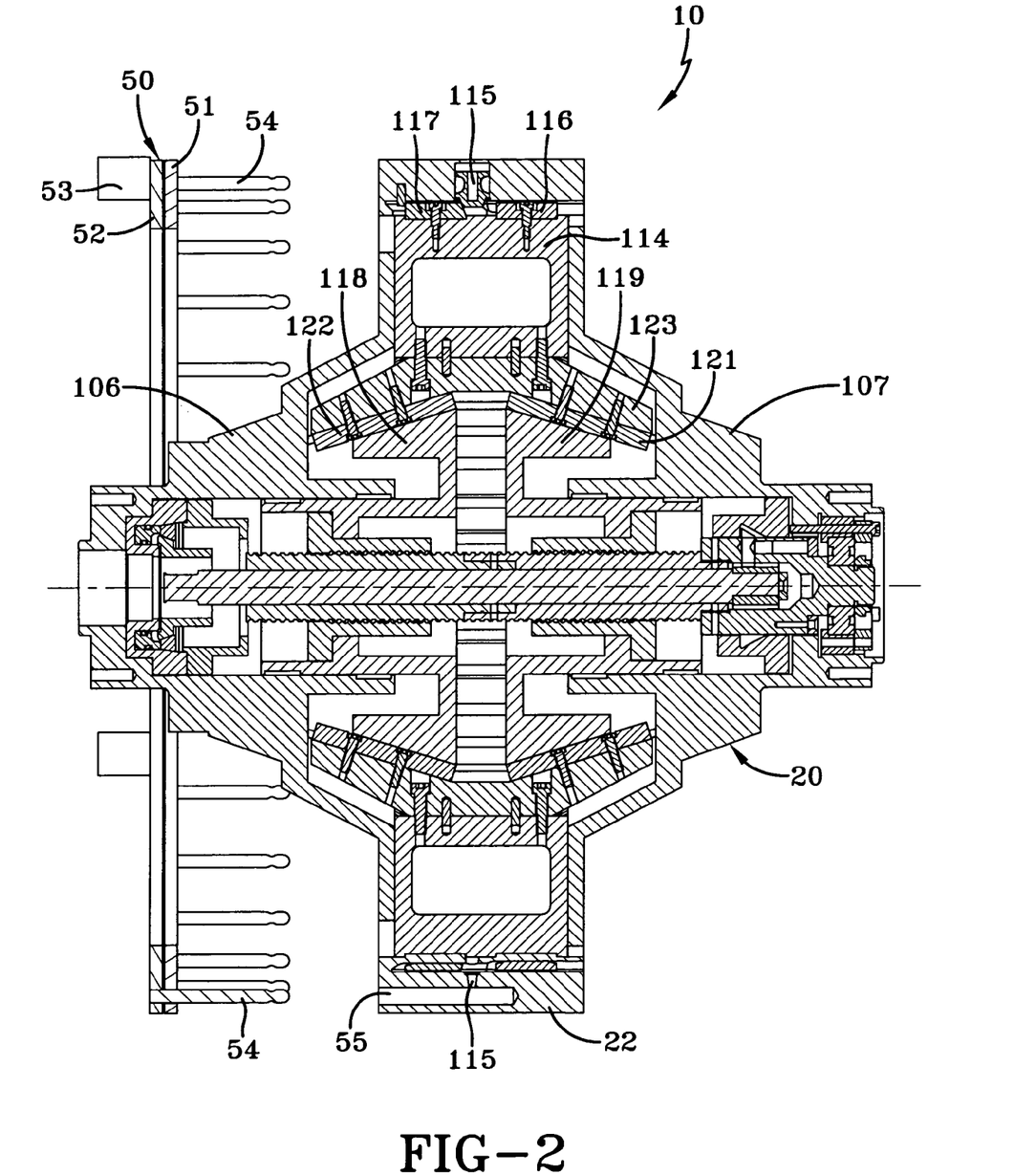
FIG. 2 is a cross-sectional view of the tread or tread belt assembly building drum of the present invention.

With reference to FIG. 2, a cross sectional view of the building drum 10 is shown along with the transfer means 50.

Figure 3:
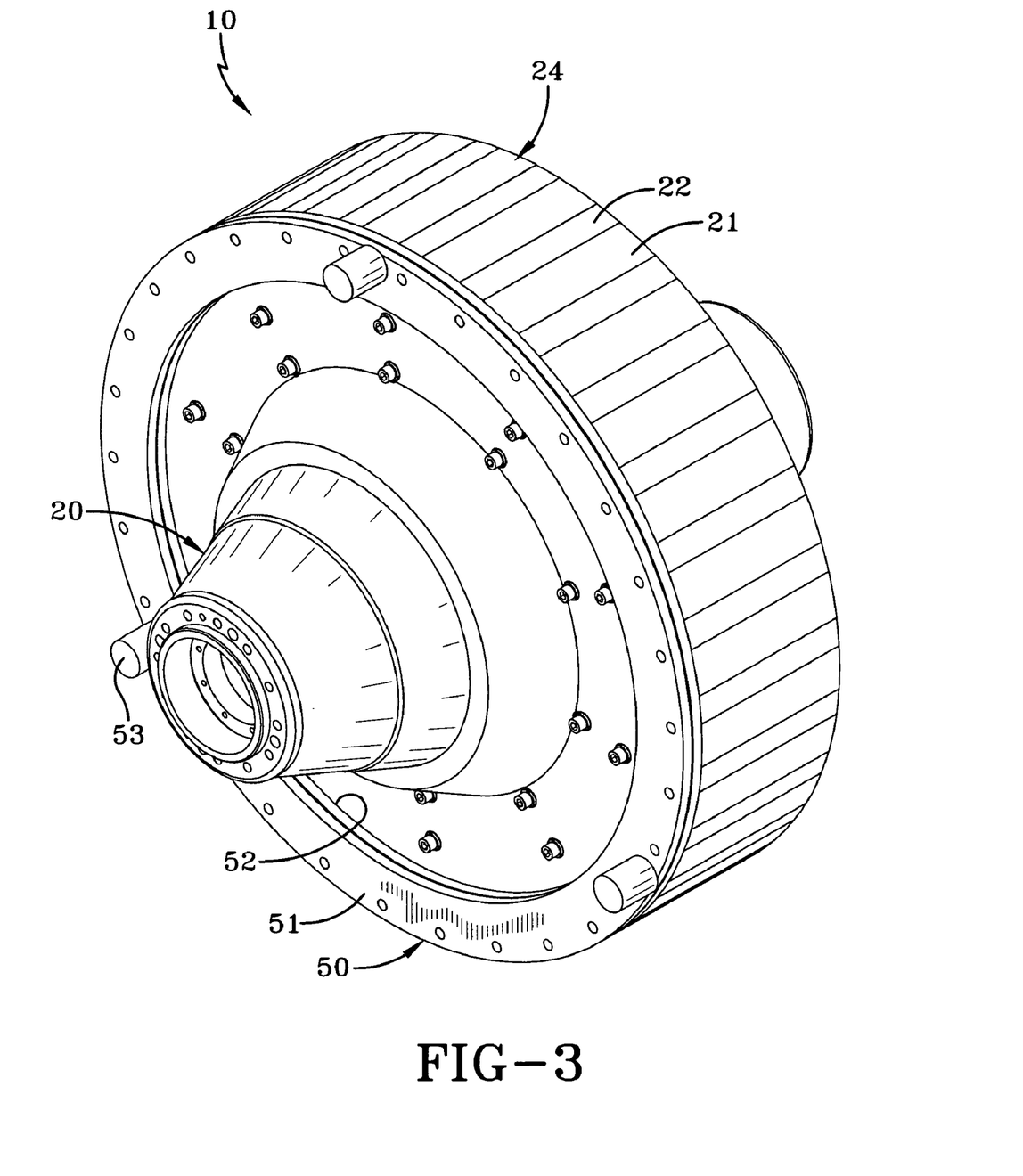
FIG. 3 is a perspective view of the transfer means engaged in the support means of the building drum.
Figure 4:
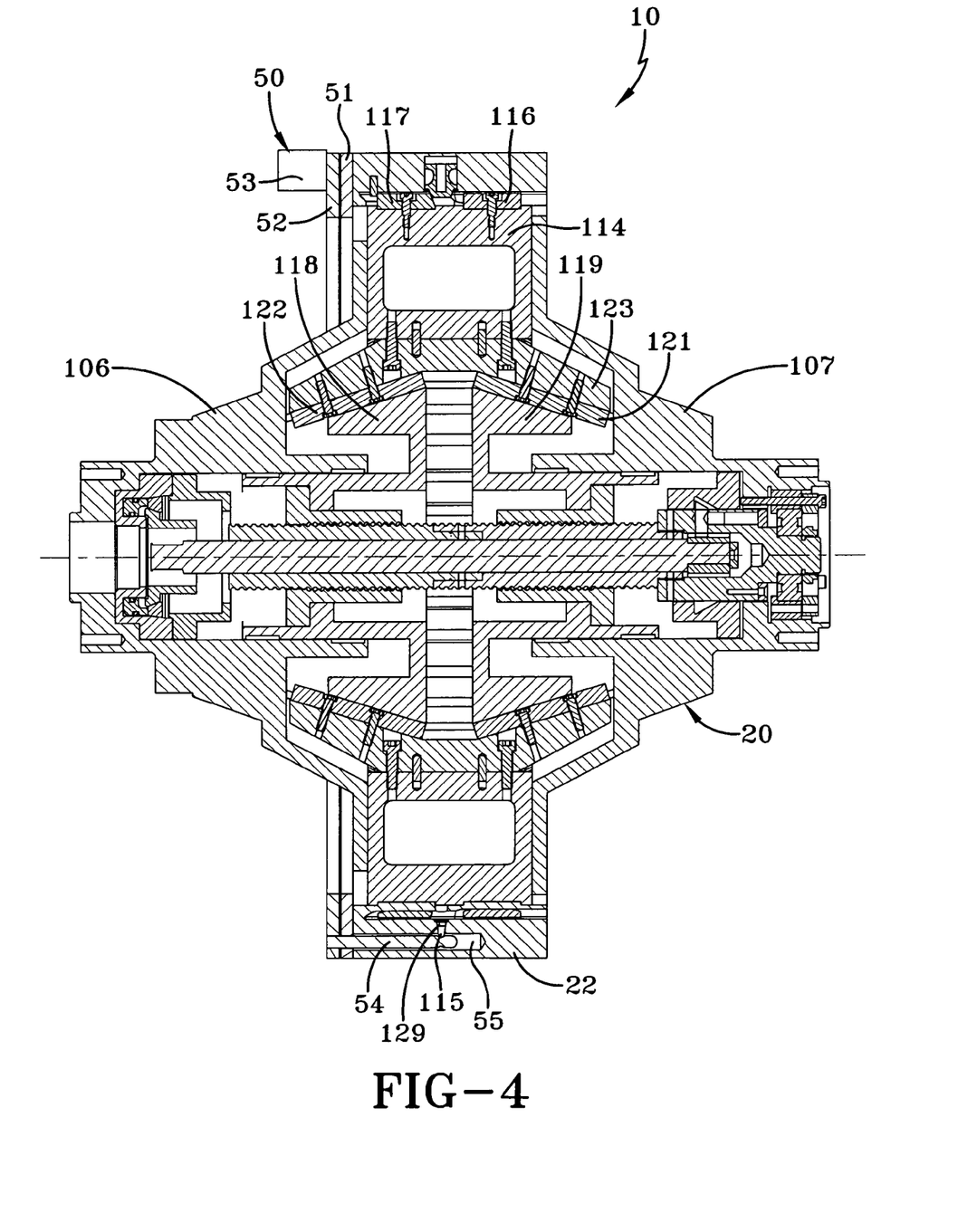
FIG. 4 is a cross-sectional view of the apparatus taken from FIG. 3.
Figure 5:
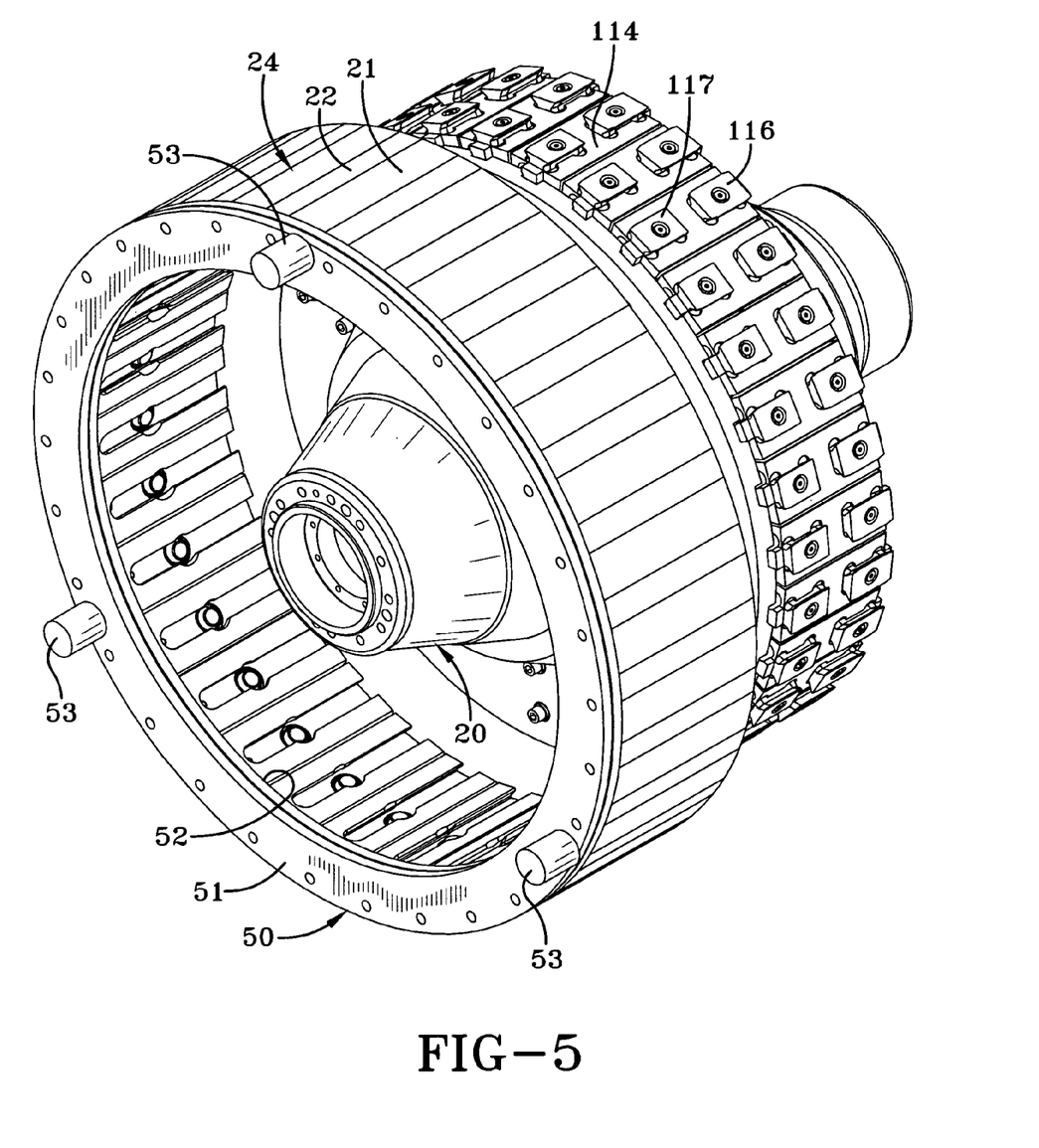
FIG. 5 is a perspective view showing the transfer means with the support means attached thereto and separated from the building drum.
Figure 6:
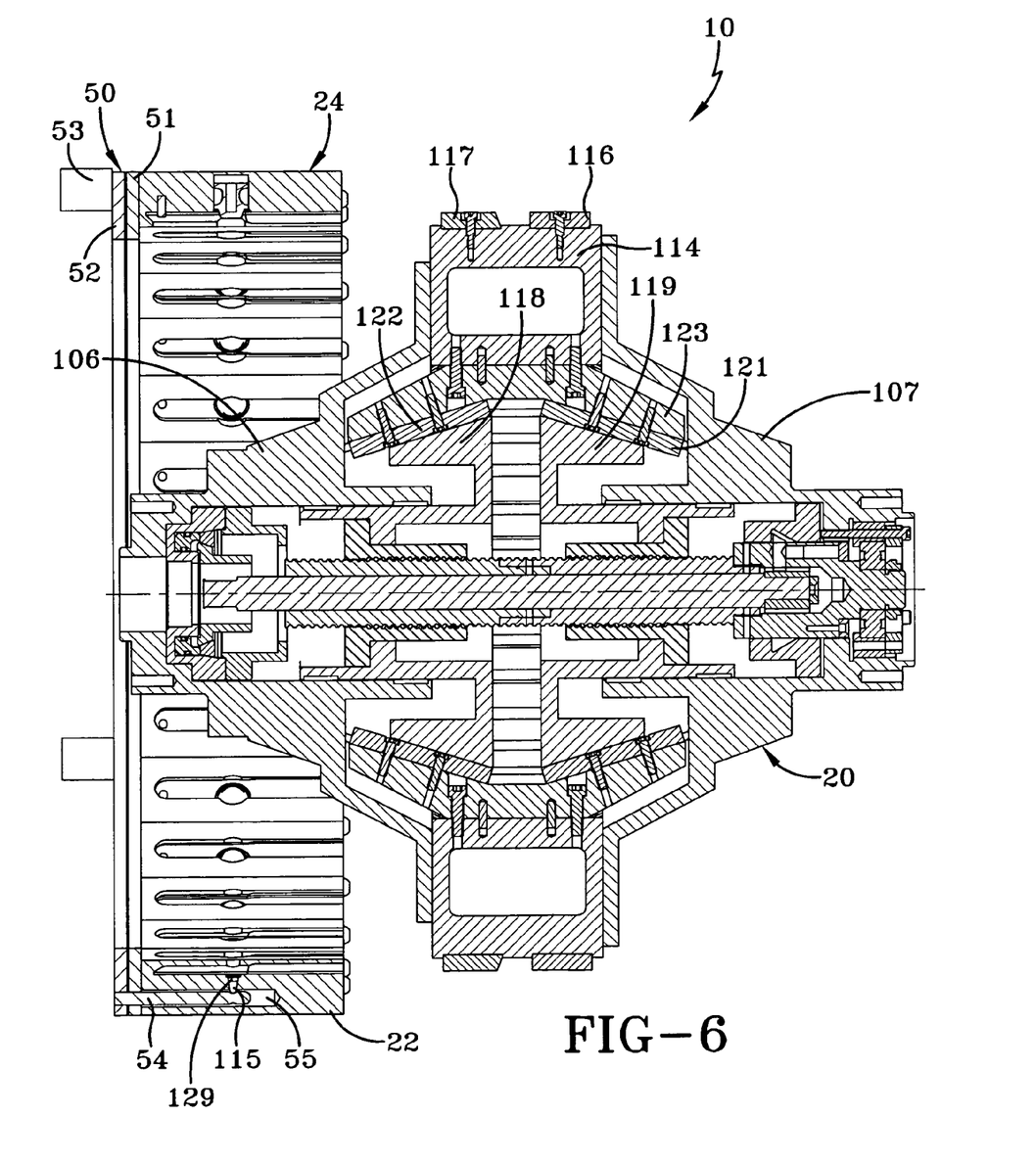
FIG. 6 is a cross sectional view of the apparatus taken from FIG. 5.

The transfer means 50 is shown not engaged to the building drum 10 or to the arcuate or straight segments 22. The combination of the arcuate or straight segments 22 and the gap spanner segments 21 form a subassembly commonly referred to as the deck. The term "deck" is commonly referred to with a similar meaning as that of the deck of a boat. It is an exterior surface upon which one can stand or build the tread assembly. For purposes of this invention the building surface 24 will commonly be referred to as the deck 24. This deck 24 which is an assembly of the arcuate or straight segments 22 and the gap spanning segments 21 is slidably mounted over deck segment guides 116 and 117. Once slid over these guides 116, 117 a detent assembly called a deck segment locking pin 115 engages and secures the deck 24 to the drum expansion segment 114 as illustrated. To remove the deck assembly 24 from the radially expandable and contractible tread building drum, the transfer means 50 is pushed into the holes 55 wherein the pins 54 engage the deck segment locking pins 115 thereby releasing them when the pins 54 are fully engaged. This is illustrated in FIGS. 3 and 4. Once engaged the transfer means 50 can be used to slidably remove the deck assembly 24 as shown in FIG. 5. The pins 54 provide radial support for the deck assembly 24 and hold the assembly 24 in the position as shown for removal. The perspective view of the removed deck assembly 24 provides a better illustration of the deck segment guides 116 and 117 and the drum expansion segment 114. As shown, the arcuate or straight segments 22 have the deck segment locking pin 115 engaged by the pin 54. A spring 129 is used in the contracted position when the pin 54 is inserted as shown in FIG. 6. Once the pin 54 is removed the spring 129 is free to release and allow the locking pin 115 to extend radially inwardly to accomplish the locking of the mechanism. This is as illustrated in the cross-sectional view of FIG. 6.

Figure 7:
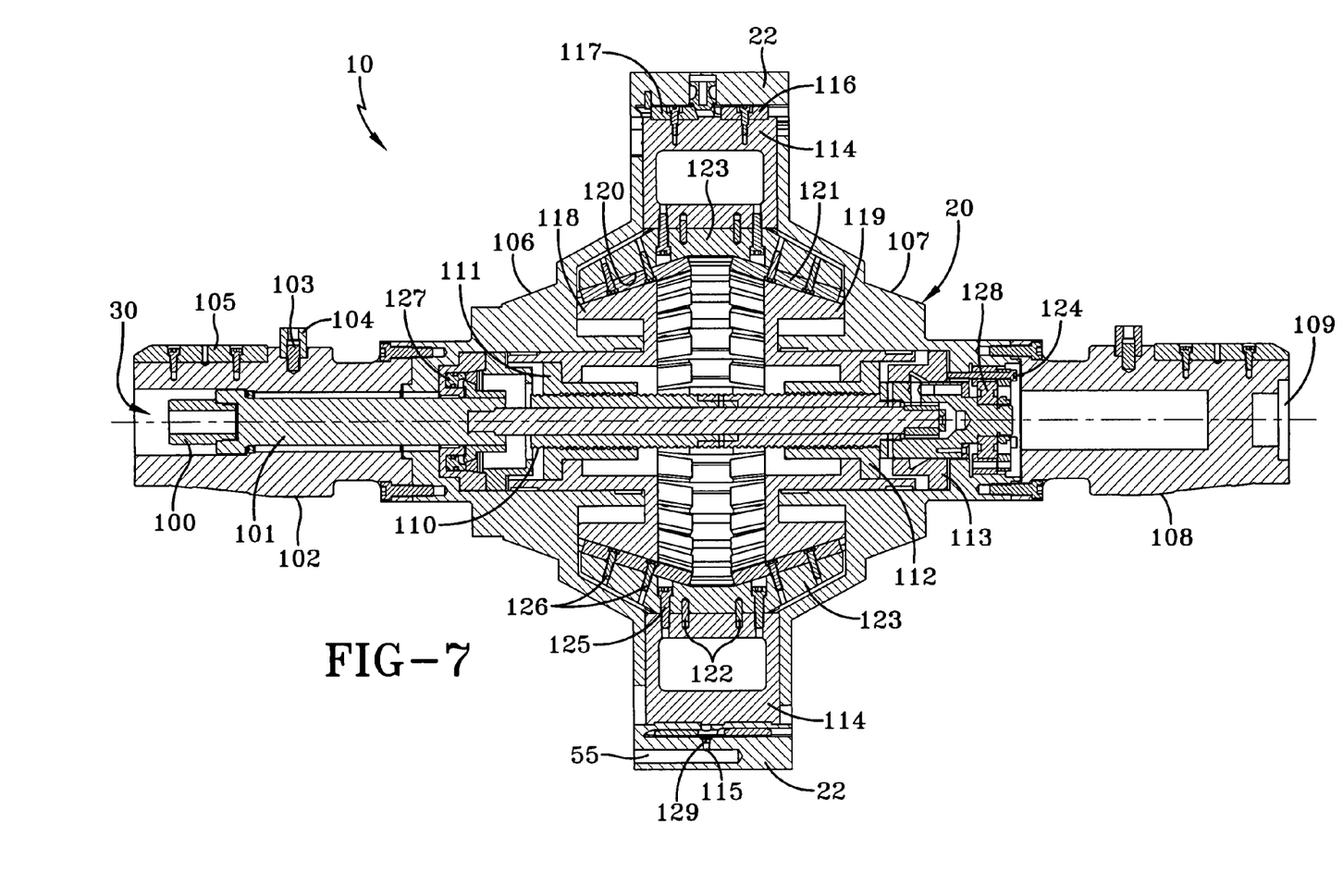
FIG. 7 is a cross-sectional view of the tread or tread belt assembly building drum attached to the drive means for rotating the drum and illustrating the means for radially expanding and contracting the support means as well as an overload clutch means.

In order for the tread belt building drum 10 to expand radially and contract radially and to provide a surface 24 upon which a tread belt assembly can be built, the building drum 10 must accept a drive means 30 that provides rotational movement of the entire building drum assembly 10 as shown in FIG. 7. The drive means 30 is connected to a motor (not illustrated) which can provide rotational movement of the tire building drum assembly 10. The drive means 30 includes a drive spline 100 which is connected to a screw drive shaft 101 and which is embedded inside a drum quick-mount mounting cone 102 as illustrated. The quick-mount mounting cone 102 provides for rapid engagement and disengagement of the drum assembly 10. The drum quick-mount mounting cone 102 has a key 104 with a key locating pin 103 as illustrated and a longitudinally extending keyway 105 as illustrated. A drum inboard housing 106 is illustrated on the left-hand side of FIG. 7 and a corresponding drum outboard housing 107 is on the right-hand side of FIG. 7. On the opposite side of the drive means 20 and the drum assembly 10 is an outboard support cone 108. The outboard support cone 108 has a live center receptacle 109. The live center permits easy rotation of the drum assembly 10 while the entire assembly is being rotated. Looking internally at the center of the mechanism or apparatus 10 there is a ball screw or acme threaded screw assembly 110. As illustrated the threaded assembly 110 is comprised of two components, one having left-hand threads and an opposite side having right-hand threads. These two components are pinned together to provide simultaneous rotation of the mechanism. On the left-hand side is an inboard ball nut or acme nut 111 connected to one end of the threaded screw 110 and on the opposite or outboard side another ball nut or acme nut 112 is illustrated. A ball screw overload protection clutch mechanism is illustrated at 113. This mechanism 113 provides capability of disengaging the shaft 110 and permitting the drum assembly 10 to collapse if the pressure is exceeded beyond the capability of the clutch 113. This override clutch protection system 113 ensures that when the mold closes or pressure is applied to the radially outer surface of the deck 24, the deck 24 can collapse as the clutch 113 disengages, permitting the entire unit or drum 10 to collapse slightly preventing any overload from damaging the internal workings of either the mold or the mechanism 10. Radially directly inward of the deck 24 or its arcuate or straight segments 22 there is illustrated a drum expansion segment 114. The drum expansion segments 114 are threadedly engaged by threaded fasteners 125 to an expanding segment base 123 as illustrated. They are also located by pins 122 as shown. Radially inward of the expanding segment base 114 is an outward outboard segment cone bushing 121 and an inboard segment cone bushing 120 which are threadedly attached using screws or threaded fasteners 126 as illustrated to the expanding segment base 123. Radially inward of the inboard segment bushing 120 is the inboard expansion cone 118. Similarly, on the outboard side the outboard segment cone bushing 121 is radially outward of an outboard expansion cone 119. The bushings 120 and 121 are designed to slide along the cone surfaces of the inboard expansion cone 118 and outboard expansion cone 119, respectively. As shown, the building drum 10 is in an expanded position such that the radially outer deck or building surface 24 is radially expanded. As the drive shaft 101 is spun or rotated inside the bearings 127, 128 the inboard ball nut 111 and outboard ball nut 112 push the expansion cones both inboard and outboard 118 and 119, respectively, radially to the center plane of the building drum 10. As these cones 118, 119 push to the center plane, the conical surface permits the expanding segment base 123 and its bushings 120 and 119 to slide along the conical surfaces and contract radially inwardly.

Figure 8A:
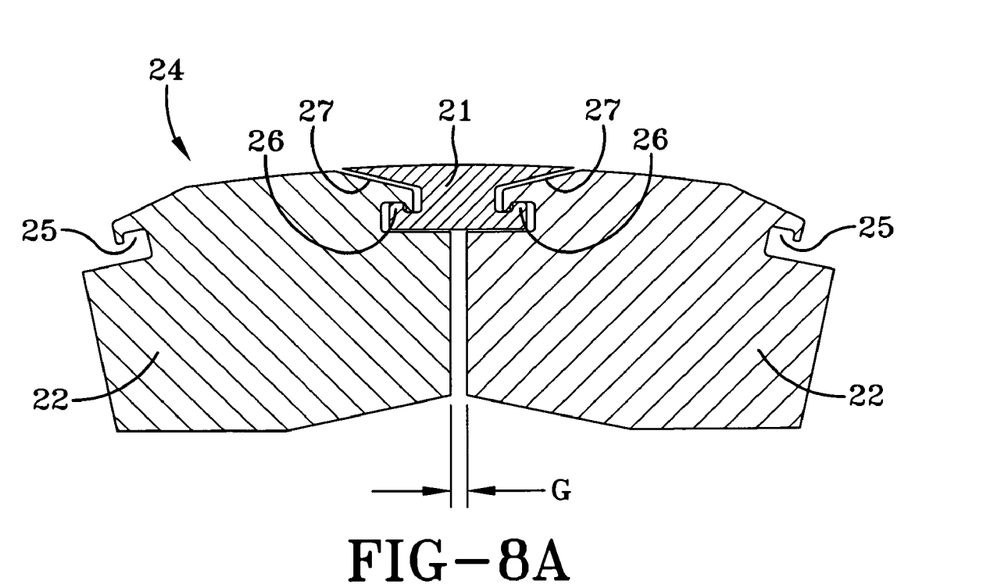
FIG. 8A is a cross-sectional view of the adjacent arcuate or straight segments with a gap spanner shown in the expanded fully open position.
Figure 8B:
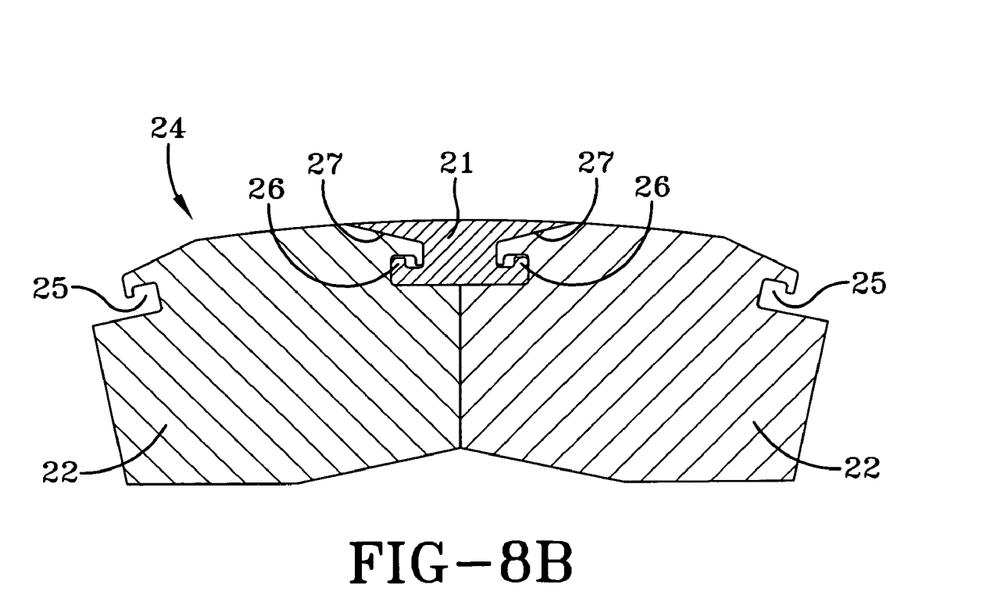
FIG. 8B is the same features illustrated in FIG. 8A but in the fully collapsed contracted position.

With reference to FIG. 8A in the fully expanded position the arcuate or straight segments 22 are shown with a gap G between each segment in the fully radially expanded position. The gap G is preferably at least 0.050 in (1.25 mm) as measured between the adjacent segments. The gap spanning segment 21 is constrained in channels 25. Each gap spanning segment 21 has lobes 26 that are captured within these channels 25. They may be slid laterally to remove the segments 21, 22 but are constrained such that the arcuate or straight segments 22 can move circumferentially a certain extent until they engage the lobes 26 as illustrated. This permits a diametrical expansion of the assembly 10 by a few millimeters. The ends of the segments 22 have a chamfered surface 27 which provides a space for the gap spanning segment to occupy at the correct diameter for tread belt building. Upon contraction, as shown in FIG. 8B, the arcuate or straight segments close upon each other and the gap spanning segments 21 are moved within the channels 25 such that the lobes 26 contact the interior surface of the arcuate or straight segments as illustrated in FIG. 8B. When this occurs the gap G between the adjacent arcuate or straight segments 22 is closed permitting each of the segments 22 to contract radially inwardly. This feature enables one to build a tread or tread belt assembly in such a manner that the tread or tread belt assembly can easily be removed once assembled to the deck assembly 24. This will be discussed later in detail.

Figure 9:
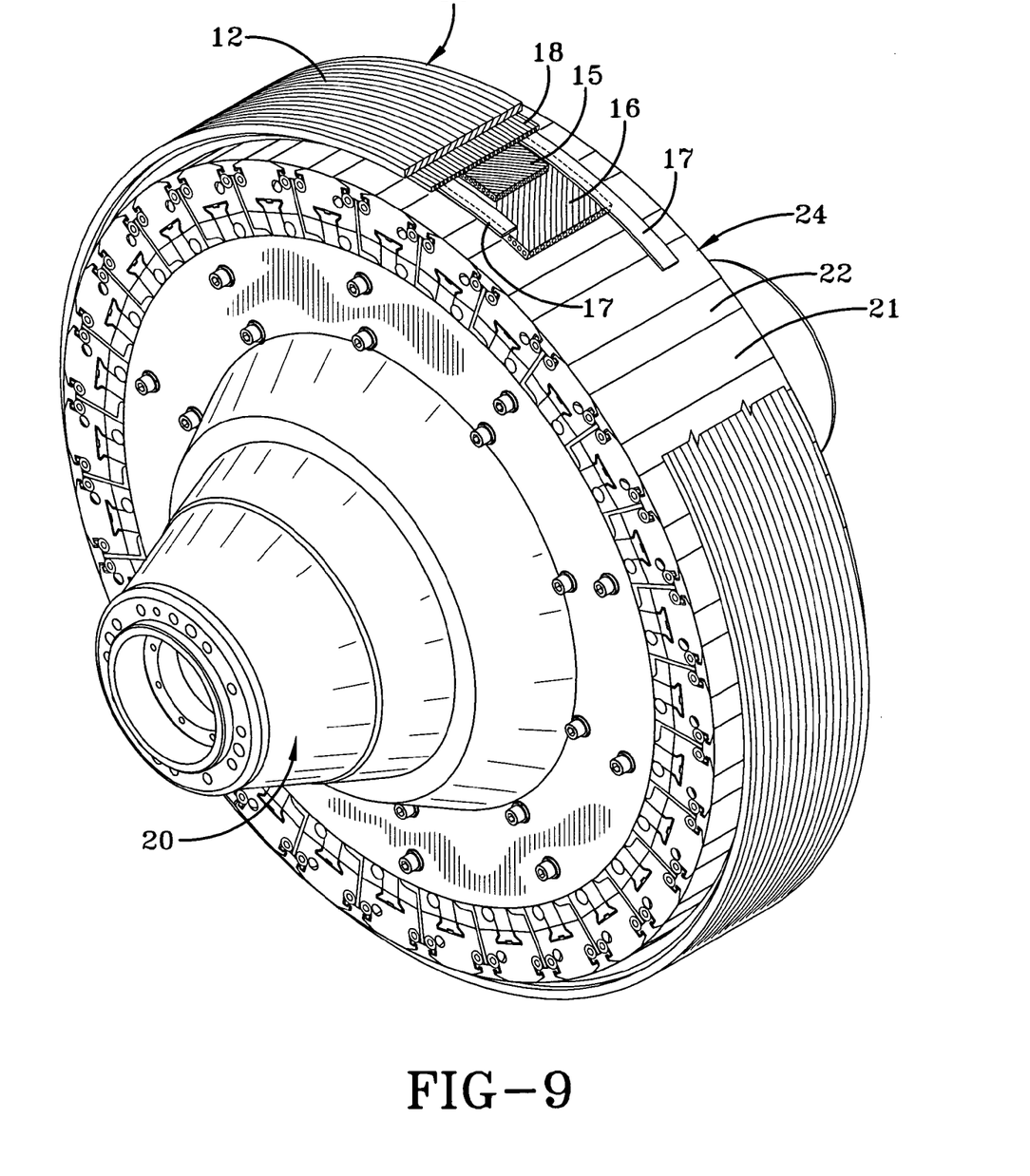
FIG. 9 is a perspective view of the building drum assembly showing a tread belt assembly as applied to the support surface.

With reference to FIG. 9, the tread drum assembly 10 is shown wherein a typical tread belt reinforcing structure 14 is shown assembled to the exterior surface or peripheral surface of the deck 24. As shown, a first belt layer 16 is illustrated lying adjacent to the surface 24. At the lateral edges of the first belt layer 16 are two belt edge elastomeric strips 17. Interposed in between the elastomeric strips 17 is a second belt layer 15 having cords oriented oppositely relative to the first belt layer 16. Optionally, and as illustrated, an overlay 18 is shown. The overlay 18 is a circumferentially extended cord reinforced structure that overlays both the second belt layer 15 and the first belt layer 16 and the underlying gum strips 17. Radially outward of the overlay 18 is an unvulcanized layer 12 of tread rubber. As illustrated the tread rubber 12 may be provided as strips of rubber wound and laid adjacently or can be provided as a single layer.

Figure 10:
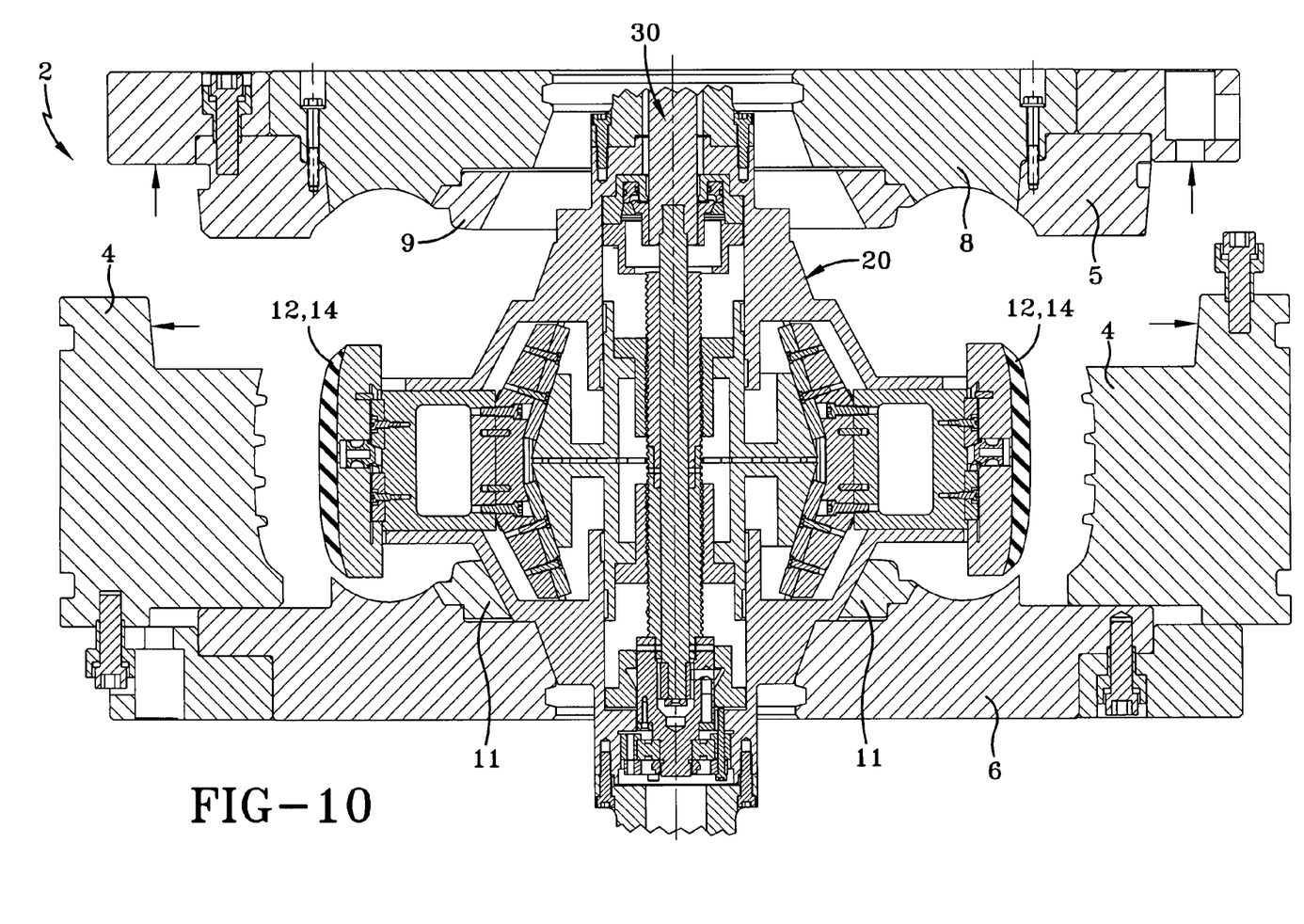
FIG. 10 is a cross-sectional view of the tread or tread belt assembly mounted on the building drum and being placed into an opened mold.
Figure 11A:
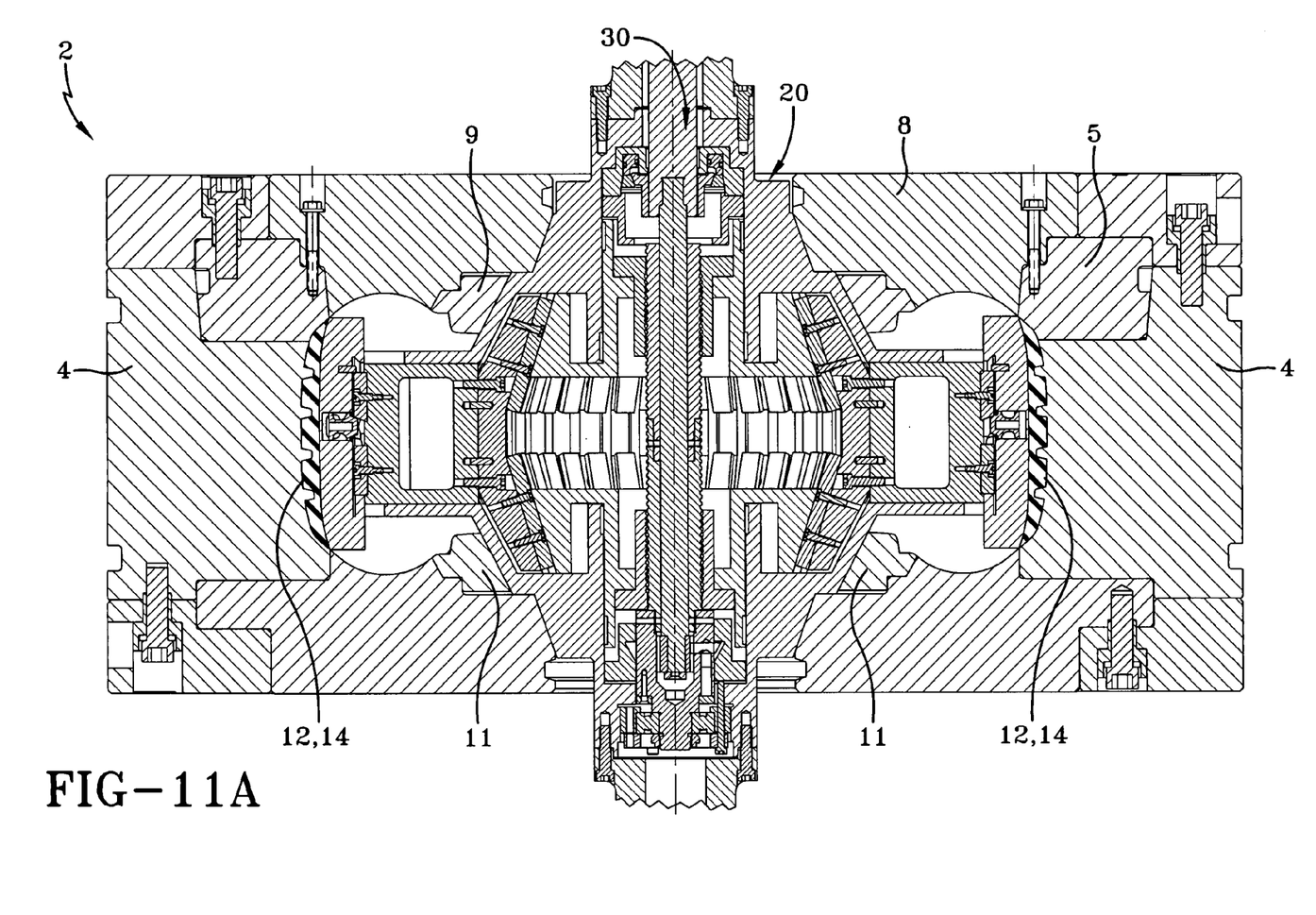
FIG. 11A is a cross-sectional view of the tread or tread belt assembly mounted on the building drum with the mold being closed onto the assembly.
Figure 11B:
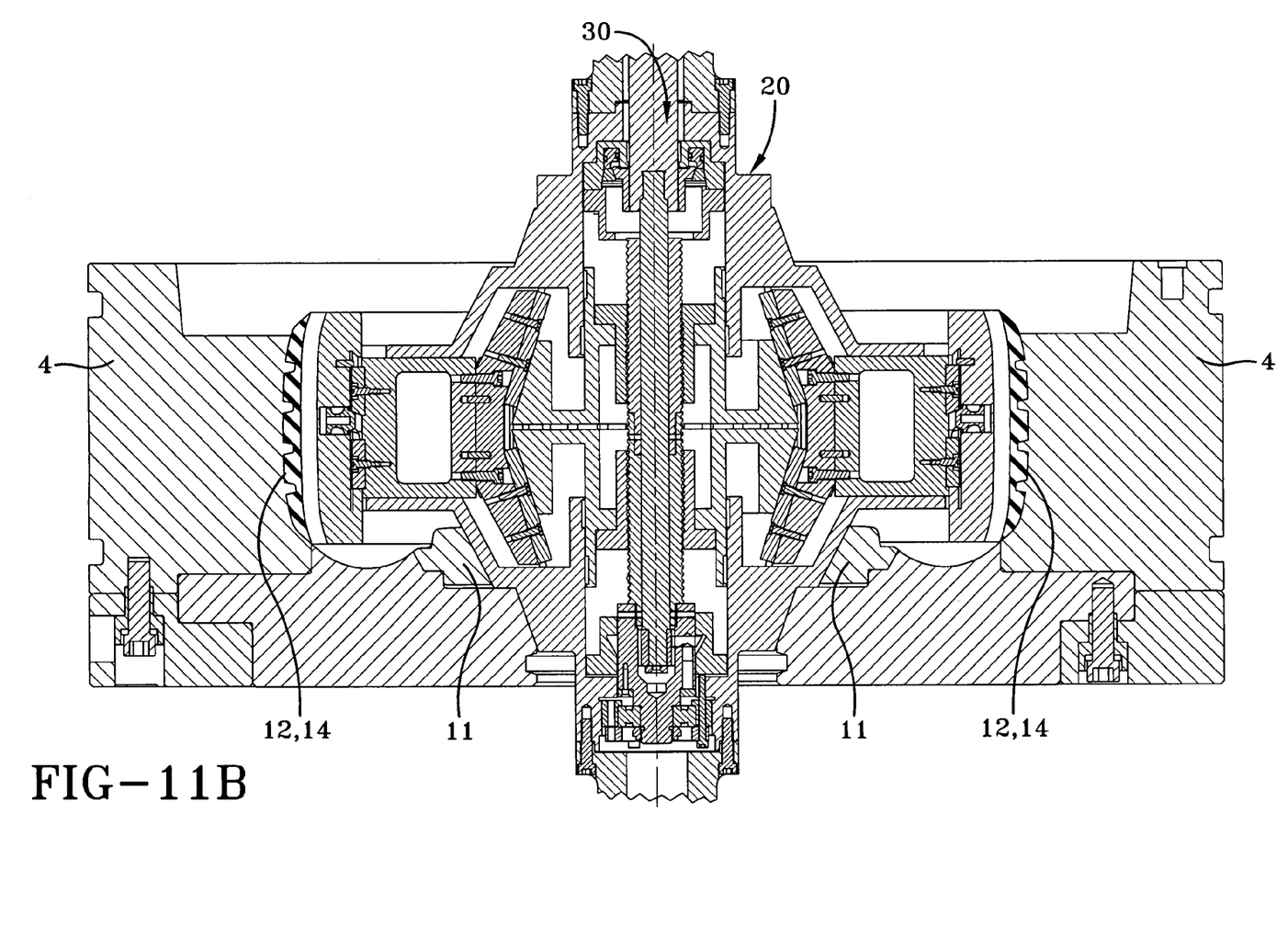
FIG. 11B is a cross-sectional view of the tread belt assembly in the mold with the building drum collapsed and being removed from the mold.
Figure 12:
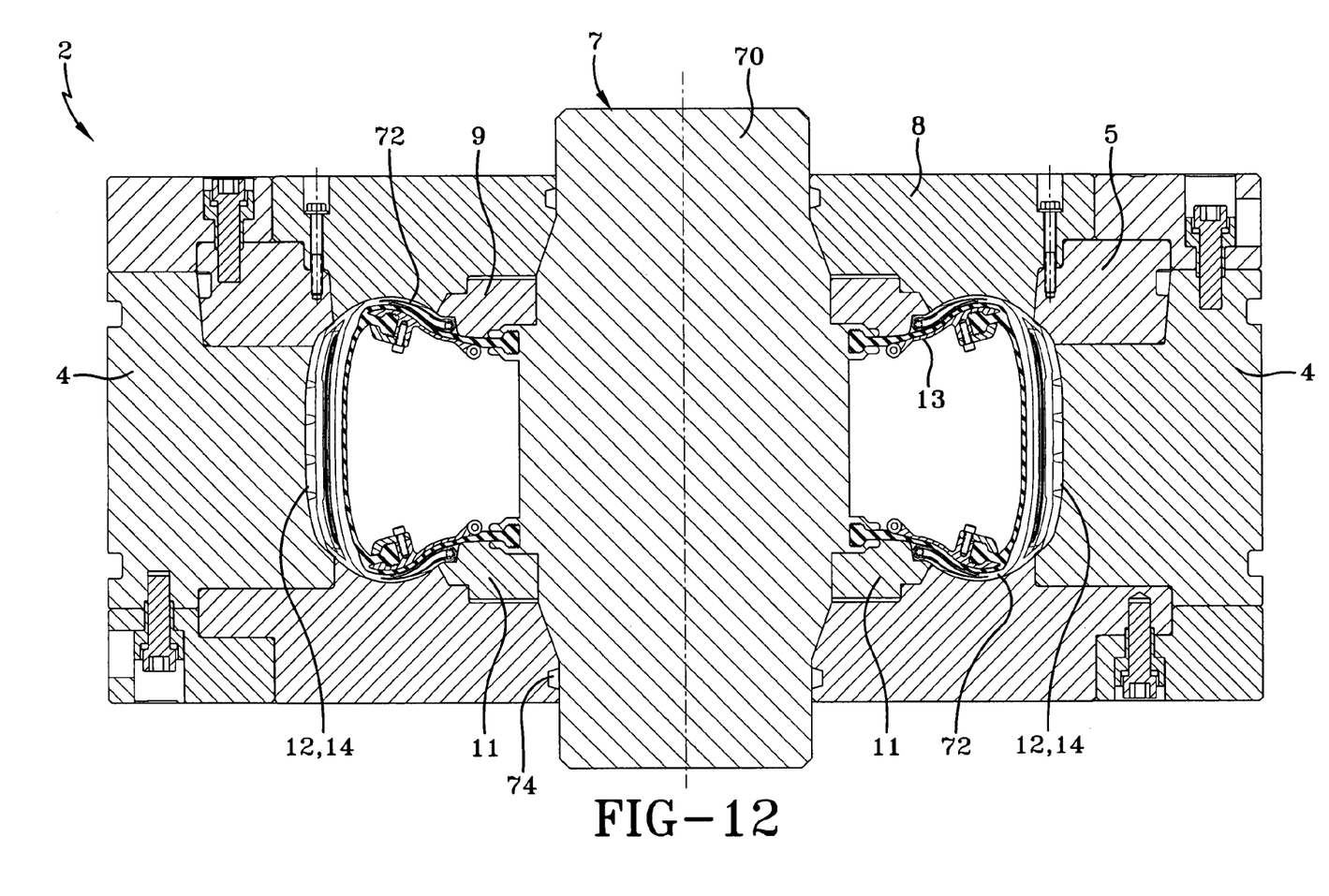
FIG. 12 is a cross-sectional view of the mold and tread or tread belt assembly being cured to a carcass assembly mounted on a collapsible building drum assembly.

With reference to FIG. 10, once the tread belt assembly 14 is applied onto the building surface 24, the entire building drum assembly can be placed inside a mold 2. In the illustrated embodiment, the tread assembly 14 is shown mounted on a building drum 10 that is in a radially expanded position and placed inside the open and expanded mold 2. The mold 2 has tread forming segments 4 on each side, a bottom plate 6, a pair of bead forming rings 11 and 9, a top plate 8, and a tread forming segment 5 attached to the top plate 8. Once inserted inside the mold 2, as shown in FIG. 11A, the mold 2 is closed and in the particular embodiment illustrated the mold segments contract against the tread belt assembly on the tread belt drum assembly 10. In this methodology the tread rubber 12 is then forced into the tread forming grooves of the segments 4. Once fully contracted the tread rubber 12 would adhere to the tread forming segments 4. As illustrated it is preferred that the tread rubber 12 be warmed or applied to the building drum 10 hot, such that when the mold closed, the rubber is relatively softened so that it will easily accept, adapt and conform to the tread forming segments 4. It is believed that the tread 12 should be warmed to a temperature of approximately 110° C., preferably between 90° C. and 110° C. Once the pressure is applied as shown, assuming the pressure does not exceed the desired limits, the entire tread belt assembly 14 will be adequately adhered to the internal surfaces of the tread forming segments 4. While the mold 2 is still closed, it is desirable then to contract the tread belt drum assembly 10 into a radially contracted position. The tread belt 14 will remain in the tread forming segments 4. Once fully retracted the drum 10 is freed from the tread belt assembly 14 and the top plate of the mold 8 can be removed along with the associated connected components as was illustrated in FIG. 10. Once the mold top plate 8 is removed, the tread drum assembly 10 can be removed from the mold 2. Once removed the tread belt 14 is left in the mold 2 with the segments 4 closed and a tire building drum assembly 7 with a green carcass 72 already mounted to it can be placed into the mold 2. As shown in FIG. 12 the carcass building drum assembly 7 has an axle 70 that is contoured and locked into the mold using locking detents 74. Once closed a gaseous fluid or steam is introduced into the interior through the axle 70 and the internal pressure is applied to the carcass adhering it to the tread belt assembly at the interfacial surfaces. The tire is then cured in this self-locking mold 2 as illustrated in FIG. 12.

When a mold 2 is first closed and the tread building drum assembly 10 is inside the mold, should the mold be misaligned or the tread rubber 12 not properly aligned for closing the segments 4, then the clutch mechanism 113 will disengage allowing the entire assembly 10 to collapse, thereby preventing damage to the mold 2 as previously discussed.

The present invention permits the assembly of the tread belt assembly 14 to be made on the building drum 10 and as illustrated and the building drum 10 being portably movable permits the entire assembly to be placed inside a mold whereby the tread belt assembly 14 can be transferred directly to the mold 2 prior to being applied to the carcass 72. Then the tread building drum assembly 10 can be collapsed and removed from the mold 2 and the entire green carcass 72 on a building drum assembly 7 can be inserted into the mold 2, locked into position, pressurized and cured to form a finished tire.

This method for molding tires is described in a self-locking and copending patent application entitled "The Method For Curing Tires and a Self-Locking Tire Mold", U.S. patent Ser. No. 10/417,849, filed on Apr. 17, 2003, which is incorporated herein by reference in its entirety. The core building drum assembly 7 for mounting the carcass directly onto is described in U.S. patent application Ser. No. 10/388,733, filed Mar. 14, 2003 and is entitled "Radially Expansible Tire Assembly Drum and Method for Forming Tires", the contents of which are incorporated herein by reference in its entirety also.

In an alternative method of practicing the invention, the tread 12 or tread belt assembly 14 can be applied to the deck 24 when the deck 24 is set at an outside diameter less than the diameter required to fit precisely in the closed mold position. Typically a small amount of at least 0.5 mm less than the desired finish diameter of the tread belt 14 is selected. In this method of assembly, once the tread 12 or tread belt assembly 14 is placed in the open mold 2 and after the mold 2 is closed and the mold segments 4 are contracted embedding into the tread rubber 12, then the drive means 30 can be rotated, expanding the building drum 10 from the slightly smaller build diameter to the precise mold diameter required. This additional expansion firmly compresses the tread 12 or tread belt assembly 14 into the mold tread forming segments 4 and insures a slight tensioning of the tread 12 or tread belt assembly 14 into the mold tread forming segments 4 and insures a slight tensioning of the tread 12 or tread belt assembly 14. Then the deck 24 can be retracted releasing it from the tread 12 or tread belt assembly 14 as previously discussed.

What is claimed is:

1. An apparatus for building and transferring a tread or tread belt reinforcing assembly, comprising:
   a support including a central axis and portions radially expandable and contractable relative to the central axis, said support further being mounted for rotation about the central axis;
   a drive coupled to said support for rotating said support about the central axis;
   a plurality of tire building surface segments removably mounted to said support and forming an annular tire building surface about the central axis, said tire building surface segments mounted for sliding movement in a direction parallel to said central axis during mounting and removal thereof relative to said support; and
   a transfer device including a plurality of radial support elements, each radial support element configured for engagement with a corresponding one of said plurality of tire building surface segments by movement in a direction parallel to the central axis, and adapted to support said corresponding one of said plurality of tire building surface segments in a radial direction as said support is contracted.

2. The apparatus of claim 1, wherein said radial support elements further comprise pins and each of said tire building surface segments includes a hole for receiving one of said pins.

3. The apparatus of claim 1, further comprising:
   a mold including a plurality of tread forming segments each including a tread forming portion, said tread forming segments configured into an annular shape about said central axis and radially outward of said tire building surface segments.

4. The apparatus of claim 1, further comprising:
   a means for radially expanding and contracting said support.

* * * * *